United States Patent Office 3,560,442
Patented Feb. 2, 1971

3,560,442
ORGANO - POLYSILOXANE COMPOSITIONS CONVERTIBLE INTO ELASTOMERS AT ROOM TEMPERATURE
Hans Dietrich Golitz, Cologne - Stammheim, Peter Schwabe, Leichlingen, and Walter Simmler, Odenthal-Schlinghofen, Germany, assignors to Farbenfabriken Bayer Aktiengesellschaft, Leverkusen, Germany, a corporation of Germany
No Drawing. Filed Oct. 1, 1968, Ser. No. 764,327
Claims priority, application Germany, Oct. 20, 1967,
P 16 94 209.9
Int. Cl. C08f 11/04
U.S. Cl. 260—46.5
11 Claims

ABSTRACT OF THE DISCLOSURE

Novel cross-linking agents are disclosed which can be combined with plastically shapable organo-polysiloxanes; the resulting novel mixtures or compositions being storage stable under exclusion of all moisture. The cross-linking reaction takes place on exposure of the compositions to water, atmospheric humidity sufficing, at temperatures below 50° C. The compositions are especially adapted to be used for the filling of joints and as sealing materials in the building industry. The elastomers resulting therefrom have an increased adhesion to the substrate saving the expenditure of priming. The novel compositions comprise:

(A) an $a,\omega$-dihydroxy-poly-(dimethyl-siloxane) which, in addition to its diorgano-siloxane units, may contain up to 10 mol-percent of siloxane units having the formula $CH_3SiO_{3/2}$, and may be admixed with fillers and an $\alpha,\omega$-bis-(trimethyl-siloxy) - poly - (dimethyl-siloxane); and (B) a cross-linking agent having the formula

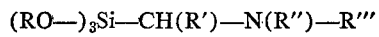

in which R is an alkyl radical with 1 to 4 carbon atoms; R′ is a hydrogen atom, an alkyl radical with 1 to 6 carbon atoms or a phenyl radical; R″ is a hydrogen atom or a methyl radical; and R‴ is a hydrogen atom, an alkyl, cycloalkyl, aminoalkyl, (methylamino)-alkyl or (dimethylamino)-alkyl radical with 1 to 6 carbon atoms in its alkyl group, or a radical having the formula (RO—)$_3$SiCH(R′)— or the formula

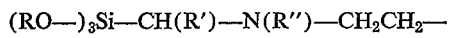

---

This invention relates to plastic organo-polysiloxane compositions, and especially to such compositions which contain cross-linking agents and which are transformed into an elastic solid state at temperatures below 50° C. in the presence of water, including atmospheric water vapor.

A number of such compositions are known and used for various purposes. Recently they have increasingly been used for the filling of joints and as sealing materials in the building industry. For this purpose it is necessary that the elastic product solidly adheres to the adjoining structural element and does not become detached, even in the case of deformations such as are caused, for example, by changes of temperature. Hitherto this has been achieved in many cases by coating the substrate with a suitable primer, but the inconvenient expenditure for such an additional operation is a disadvantage.

There is, therefore, a demand for organo-polysiloxane compositions giving elastomers which adhere well to silicate building materials, to metals, such as aluminum and alloy steel, which have recently been used to an increasing extent for wall covering, and also to synthetic resins, without the necessity of any prior treatment of the substrate. Among other properties, special attention should be paid to the duration of the plastic moldability after the start of the influence of moisture; in general, this should be of the order of 30 minutes. It is desirable that a converted film be then formed on the free surface, which prevents a continuous absorption of dirt and unintentional deformation.

Of the known materials of the type described above, those which contain an acyloxy-silicon compound as the cross-linking agent have the disadvantage (a) of forming a free acid in the course of converting and (b) of adhering solidly only to a limited number of building materials when converted.

Those known materials in which the cross-linking agents are silyl derivatives of acylamides or oximes admittedly yield final products of neutral reaction, but their adhesion is even poorer than that of the products mentioned above.

The likewise known materials containing aminosilanes or aminosilazanes as cross-linking agents exhibit better adhesion, but in the course of the hydrolytic cross-linking reaction they form amines which have an unpleasant odor and are slightly toxic.

According to the present invention a convertible organo-polysiloxane composition storable with the exclusion of water and convertible into an elastic molding or coating under the influence of water or water vapor, including that of the atmosphere, at temperatures below 50° C., comprises (A) an $\alpha,\omega$-di-hydroxy-poly-(diorgano-siloxane) which, in addition to its di-organo-siloxane units, may contain up to 10 molar percent of siloxane units of the formula $CH_3SiO_{3/2}$, and (B) a nitrogen-containing organo-silicon compound as cross-linking agent, optionally in admixture with fillers, optionally also in admixture with an $\alpha,\omega$-bis - (trimethylsiloxy)-poly-(diorgano-siloxane), the nitrogen-containing cross-linking agent having the general formula

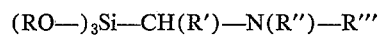

in which R is an alkyl radical with 1 to 4 carbon atoms; R′ is a hydrogen atom, an alkyl radical with 1 to 6 carbon atoms or a phenyl radical; R″ is a hydrogen atom or a methyl radical; and R‴ is a hydrogen atom, an alkyl, cycloalkyl, aminoalkyl, (methylamino)-alkyl or (dimethylamino)-alkyl radical with 1 to 6 carbon atoms in its alkylene group, or a radical of the general formula (RO—)$_3$Si—CH(R′)— or of the general formula

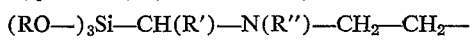

The proportions of the components of the composition, and its manner of manufacture, correspond to those of the known materials. Normally, the component (A) is admixed with 2 to 25% by weight of cross-linking agent (B). Thereto is added, in most cases, an amount of up to 135% by weight of fillers, which may be active, e.g. finely divided silica, or inactive, e.g. zinc oxide or calcium carbonate, or mixtures of these. Depending on the demands made on the technical properties of the converted product, substantial amounts, for example up to 50% by weight, of an $\alpha,\omega$-bis-(trimethylsiloxy)-poly-(diorgano-siloxane) may be added as plasticizer. In order to obtain highly elastic products, it is preferred to use a component (A) which contains $CH_3SiO_{3/2}$ units.

It is also possible to include in the composition, in known manner, suitable metal compounds, especially di-alkyl-tin dicarboxylates, in order to accelerate the cross-linking reaction. The production of compositions according to the invention will usually be carried out by first kneading the substantially anhydrous non-cross-linking components together to form a base paste, then adding the cross-linking agent to the latter and finally degassing the whole mixture at room temperature by reducing the pressure.

These mixtures are stable on storage if water is excluded. When brought into the open air for use, they form, in accordance with the technical requirements, after a period of 15 minutes to 2 hours, a coherent film on the surface and solidify within an adequate period of time, i.e., progressing in 24 hours by 2 to 6 mm. in depth, to form elastic moldings or coatings which adhere to silicate substrates, many metals and some organic substances. They do not split off acids or amines. The specific odor of the cross-linking agent they contain according to the invention is only slightly on account of its low vapor pressure.

It has already been proposed to use similar compounds, viz aminopropyl-triethoxysilane and N-(aminoethyl)-aminopropyl-triethoxysilane as cross-linking agents at room temperature for organo-polysiloxanes; cf. U.S. patent specification No. 3,280,072, column 2, lines 56 et seq., and Example 2. However, when an attempt was made to proceed in the manner there described by mixing the two aforesaid compounds with 25 times their weight of $\alpha,\omega$-dihydroxy-poly-(dimethylsiloxane) of 4000 or 18,000 cst. viscosity (20° C.) and exposing the mixtures produced in a layer of 2.5 mm. thickness to atmospheric humidity, it was found that, contrary to the aforesaid description, such mixtures did not solidify after 7 days and were still liquid even after 4 weeks and more. Even pastes made of 90 g. $\alpha,\omega$-dihydroxy-poly-(dimethylsiloxane) of 18,000 cst. (20° C.), 10 g. finely divided silica and 5 g. of one of the two nitrogen-containing organo-silicon compounds mentioned above, did not exhibit any conversion into an elastomer after 7 days in the air.

The following examples are given for the purpose of illustrating the invention. For the mixtures according to Examples 1 to 5 and in the comparative tests A to D described further below there was used a "base paste" which consisted of 1590 g. $\alpha,\omega$-dihydroxy-poly-(dimethylsiloxane) of 18,000 cst. viscosity at 20° C., 600 g. $\alpha,\omega$-trimethylsiloxy-poly-(dimethylsiloxane) of 1000 cst. viscosity at 20° C., 200 g. finely divided silica and 234 g. finely ground calcium carbonate which contained 0.1 percent by weight of water.

EXAMPLE 1

As cross-linking agent there was used a silane derivative of the formula (C₂H₅O—)₃Si—CH(C₆H₅)—N(CH₃)
 —CH₂—CH₂—NH—CH₃ which can be prepared in the following manner:

A mixture of 88 g. N,N'-dimethyl-ethylene-diamine and 66 g. α-(triethoxysilyl)-benzyl bromide is heated at boiling temperature under reflux for 8 hours, whereupon two liquid phases are formed. The reaction mixture is allowed to cool and to settle, the two phases are separated and the upper phase is freed from readily volatile components by heating at 100° C. under 12 mm. Hg. There remains a brown liquid which has the structure of the above formula.

5 g. thereof were mixed with 100 g. of the base paste described above and there was thus obtained a molding mass which was unchanged after 4 months when stored with the exclusion of moisture, and which formed a coherent surface film within about 25 minutes of being exposed to the open air.

For testing, this molding mass was applied in layers of 4 mm. thickness, 20 mm. width and 50 mm. length to a number of materials which are listed in the annex table. These layers were converted into elastic solid bodies after about 18 hours.

EXAMPLE 2

As cross-linking agent there was used a silane derivative of the formula (C₂H₅O—)₃Si—CH(C₆H₅)—N(CH₃)—CH₂CH₂
 —N(CH₃)—CH(C₆H₅)—Si(—OC₂H₅)₃ which can be prepared in the following manner:

A mixture of 200 g. triethylamine, 13.2 g. N,N'-dimethylethylene-diamine and 100 g. α-(triethoxysilyl)-benzyl bromide is heated at boiling temperature under reflux for 8 hours, the reaction mixture is diluted with 100 cc. cyclohexane and the precipitated triethyl ammonium bromide is filtered off. The filtrate is freed from readily volatile components by heating at 100° C. under 12 mm. Hg and a pale brown liquid of the above structural formula is obtained as residue.

5 g. thereof were mixed with 100 g. of the base paste and there was thus obtained a molding mass which was unchanged after 3 months when stored with the exclusion of moisture. When applied in a layer 4 mm. thick to the materials listed in the annexed table in the manner described in Example 1, this molding mass formed a coherent film in air within about 40 minutes and was thoroughly converted after about 24 hours.

EXAMPLE 3

As cross-linking agent there was used a silane derivative of the formula (C₂H₅O—)₃—Si—CH(C₆H₅)—NH—CH₃ which can be obtained in the following manner:

100 g. α-(triethoxysilyl)-benzyl bromide are placed in a pressure vessel, 45 g. methylamine are subsequently added by condensation and the closed vessel is heated at a temperature between 145 and 155° C. for 7 hours, an excess pressure of about 13 atm. being generated in the interior. The vessel is then allowed to cool, the excess methylamine is removed and the content is separated from the precipitated methyl-ammonium bromide by filtration. Distillation of the filtrate at 0.5 mm. Hg and 127° C. yields a fraction which has the above structural formula.

5 g. thereof were mixed with 100 g. of the base paste. The molding mass so obtained had the same stability on storage as did the products prepared according to Examples 1 and 2. When applied in a layer 4 mm. thick to the materials listed in the annexed table in the manner described in Example 1, this molding mass formed a coherent film in air within about 25 minutes and was thoroughly converted after about 20 hours.

EXAMPLE 4

As cross-linking agent there was used a silane derivative of the formula (C₂H₅O—)₃Si—CH(CH₃)—NH—C₃H₇ which can be obtained in the following manner:

A mixture of 250 g. n-propylamine and 97 g. α-bromoethyltriethoxysilane is heated at boiling temperature under reflux for 12 hours, the reaction mixture is diluted with 150 cc. cyclohexane and the precipitated propyl-ammonium bromide is filtered off. The filtrate is fractionally distilled and at 17 mm. Hg there is obtained a fraction which constantly boils at 122° C. and has the above structural formula.

5 g. thereof were uniformly mixed with 100 g. of the base paste, and there was thus obtained a molding mass having the same stability on storage as had the products described in Examples 1 to 3. In the open air it formed an elastic surface film within about 20 minutes and was thoroughly converted to a depth of 6 mm. after about 24 hours.

EXAMPLE 5

As cross-linking agent there was used a silane derivative of the formula (C₂H₅O—)₃Si—CH(C₆H₅)—NH—C₄H₉ which can be prepared in the following manner:

A mixture of 148 g. n-butylamine and 166.5 g. α-(triethoxysilyl)-benzyl bromide is heated at boiling temperature under reflux for 2½ hours, the reaction mixture is diluted with 100 cc. cyclohexane and the precipitated butyl-ammonium bromide is filtered off. The filtrate is fractionally distilled and at 12 mm. Hg and between 165 and 168° C. there is obtained a colorless liquid of the above structural formula.

10 g. thereof were mixed with 200 g. of the base paste. The molding mass so obtained was unchanged after 4 months storage under seal and was thoroughly converted to a depth of 4 mm. after exposure for about 20 hours in air.

EXAMPLE 6

As cross-linking agent there was used a silane derivative of the formula

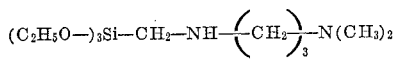

which can be prepared in the following manner:

A mixture of 240 g. N,N-dimethyl-propylene-diamine and 99 g. chloromethyl-triethoxysilane is heated at boiling temperature under reflux for 3 hours and the cooled reaction mixture is then diluted with 150 cc. cyclohexane. Two liquid phases are formed which are separated after settling. The upper phase is distilled and at 1 mm. Hg there is obtained a fraction which boils at 125° C. and has the above structural formula.

6 g. thereof were mixed with 100 g. of a base paste prepared by mixing 800 g. α,ω-dihydroxy-poly-(dimethylsiloxane) and 60 g. finely divided silica and there was thus obtained a molding mass of properties analogous to those described in the preceding examples.

In the following table there are compiled the results of a number of adhesion tests which were carried out with the test layers described in Examples 1 to 5. For comparison purposes the same tests were performed with a number of known molding masses obtained by mixing 200 g. of the base paste used in Examples 1 to 5 with, respectively, (A) 10 g. methyl-triacetoxysilane
(B) 10 g. methyl-tri-(cyclohexylamino)-silane,
(C) 10 g. of a cross-linking agent of the formula $CH_3-Si[-O-N=C(CH_3)-C_2H_5]_3$ and 0.8 g. dibutyl tin dilaurate,
(D) 10 g. of a cross-linking agent of the formula $C_2H_5O-Si(CH_3)[-N(CH_3)-C(=O)-C_6H_5]_2$ and 0.3 g. dibutyl tin dilaurate.

After 4 days the layers applied to the materials listed in the first column of the table could not be removed from the substrate without being destroyed in the cases marked +, whereas the layers could be removed undestroyed in the cases marked O.

TABLE

| | Examples | | | | | Control | | | |
|---|---|---|---|---|---|---|---|---|---|
| | 1 | 2 | 3 | 4 | 5 | A | B | C | D |
| Adhesion to: | | | | | | | | | |
| Aluminum | + | + | + | + | + | + | + | 0 | 0 |
| Iron | + | + | + | + | + | + | + | 0 | 0 |
| Alloy steel | + | + | + | + | + | 0 | 0 | 0 | 0 |
| Zinc | + | + | + | + | + | 0 | 0 | 0 | 0 |
| Nickel | + | + | + | O | + | 0 | 0 | 0 | 0 |
| Brass | + | + | + | + | O | + | 0 | 0 | 0 |
| Copper | + | + | + | + | O | 0 | 0 | 0 | 0 |
| Glass | + | + | + | + | + | + | + | + | + |
| Ceramics | + | + | + | + | + | + | + | + | 0 |
| Enamel | + | + | + | + | + | + | + | + | 0 |
| Asbestos cement | + | + | + | + | 0 | + | + | + | + |
| Heat-cured siloxane elastomers | + | + | + | + | + | + | 0 | + | 0 |
| Polyester with glass fibres | + | + | + | + | + | + | + | + | 0 |
| Phenol resin | + | + | + | + | + | + | + | + | 0 |
| Polyvinyl chloride | + | + | + | + | + | 0 | 0 | 0 | 0 |
| Styrene-butadiene resin | + | O | + | O | O | 0 | 0 | 0 | 0 |
| Acrylate resin | + | O | + | O | O | + | 0 | 0 | 0 |
| Polycarbonate | + | + | + | + | + | 0 | 0 | 0 | 0 |
| Wood | + | + | O | O | + | 0 | 0 | 0 | 0 |

What is claimed is:

1. A plastically shapable organopolysiloxane composition storable under exclusion of water and convertible into the solid elastic state under the action of water vapor including atmospheric humidity, at a temperature of from room temperature to 50° C., comprising:

(A) an α,ω-dihydroxy-poly-(dimethylsiloxane) and
(B) a cross-linking agent having the formula:

$$(RO-)_3Si-CH(R')-N(R'')-R'''$$

in which R is an alkyl radical with 1 to 4 carbon atoms; R' is a member selected from the group consisting of hydrogen, alkyl containing 1 to 6 carbon atoms, and phenyl, R'' is hydrogen or methyl; and R''' is a member selected from the group consisting of hydrogen, alkyl, cycloalkyl, aminoalkyl, (methylamino)-alkyl, (dimethylamino)-alkyl, each of the latter having 1 to 6 carbon atoms in its alkyl group, and a radical having one of the formulae $$(RO-)_3SiCH(R')-$$

and $$(RO-)_3SiCH(R')-N(R'')-CH_2CH_2-$$

wherein R, R' and R'' are as above defined.

2. A plastically shapable organo-polysiloxane composition according to claim 1, wherein said cross-linking agent (B) has the formula

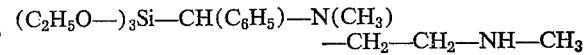

3. A plastically shapable organo-polysiloxane composition according to claim 1, wherein said cross-linking agent (B) has the formula

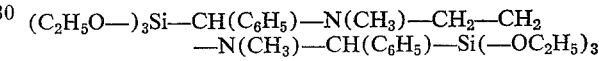

4. A plastically shapable organo-polysiloxane composition according to claim 1, wherein said cross-linking agent (B) has the formula:

$$(C_2H_5-O-)_3Si-CH(C_6H_5)-NH-CH_3$$

5. A plastically shapable organo-polysiloxane composition according to claim 1, wherein said cross-linking agent (B) has the formula $$(C_2H_5O-)_3Si-CH(CH_3)-NH-C_3H_7$$

6. A plastically shapable organopolysiloxane composition according to claim 1, wherein said cross-linking agent (B) has the formula $$(C_2H_5O-)_3Si-CH(C_6H_5)-NH-C_4H_9$$

7. A plastically shapable organo-polysiloxane composition according to claim 1, wherein said cross-linking agent (B) has the formula $$(C_2H_5O-)_3Si-CH_2-NH(CH_2)_3N(CH_3)_2$$

8. A composition according to claim 1, wherein said α,ω-dihydroxy-poly-(dimethylsiloxane) contains up to 10 mol-percent of siloxane units of the formula $CH_3SiO_{3/2}$.

9. A composition according to claim 1, wherein said organo-polysiloxane composition is admixed with a filler.

10. A composition according to claim 1, wherein said organo-polysiloxane composition is admixed in an amount up to 50% by weight thereof with an α,ω-bis-(trimethylsiloxy)-poly-(dimethyl-siloxane).

11. A composition according to claim 1, wherein said organo-polysiloxane composition is admixed with a dialkyl tin carboxylate.

References Cited

UNITED STATES PATENTS

| 3,032,528 | 5/1962 | Nitzsche et al. | 260—46.5 |
| 3,280,072 | 10/1966 | Frankland | 260—46.5 |
| 3,364,161 | 1/1968 | Nadler | 260—18 |

DONALD E. CZAJA, Primary Examiner

M. I. MARQUIS, Assistant Examiner

U.S. Cl. X.R.

117—124, 125, 126, 135.1, 138.8, 148; 260—18, 37